United States Patent [19]

Lee et al.

[11] Patent Number: 4,649,545
[45] Date of Patent: Mar. 10, 1987

[54] COMPACT GAS LASER HAVING EXTENDED LIFE

[75] Inventors: Wei-long W. Lee, Covina; Michael J. Dorich, Vista; Jeff W. Eerkens, Pacific Palisades, all of Calif.

[73] Assignee: Melles Griot, San Marcos Company, San Marcos, Calif.

[21] Appl. No.: 784,377

[22] Filed: Oct. 4, 1985

[51] Int. Cl.[4] .............................................. H01S 3/03
[52] U.S. Cl. ....................................... 372/61; 372/63
[58] Field of Search ............................. 372/61, 63, 55

[56] References Cited

U.S. PATENT DOCUMENTS

| | | |
|---|---|---|
| 2,879,439 | 3/1959 | Townes . |
| 3,242,439 | 3/1966 | Ridgen et al. . |
| 3,334,314 | 8/1967 | White . |
| 3,395,364 | 7/1968 | Bridges . |
| 3,396,343 | 8/1968 | Wesselink . |
| 3,430,158 | 2/1969 | Fox et al. . |
| 3,464,025 | 8/1969 | Bell . |
| 3,528,028 | 9/1970 | Baird . |
| 3,614,653 | 10/1971 | Javan et al. . |
| 3,626,235 | 12/1971 | Kupsky . |
| 3,899,751 | 8/1974 | Hochuli . |
| 3,947,781 | 3/1976 | Hernqvist . |
| 3,955,152 | 5/1976 | Lewis . |
| 4,158,821 | 6/1979 | Bresman . |
| 4,268,799 | 5/1981 | McCrickerd . |
| 4,311,969 | 1/1982 | Kolb . |
| 4,439,862 | 3/1984 | Mohler . |
| 4,475,202 | 10/1984 | Baron et al. . |
| 4,541,097 | 9/1985 | Kuwabara et al. ................... 372/61 |

OTHER PUBLICATIONS

"Compt. Rendu", vol. 256, Apr. 1963, pp. 3438-3439.
"Gaseous Optical Masers", W. R. Bennett, Jr., Supplement I to Applied Optics, 1962, pp. 38-45.
"New Helium-Neon Optical Maser Transitions", R. A. McFarlane, et al., Proc. IRE, vol. 50, Oct. 1962, p. 2111.
"The Interaction of Visible and Infrared Maser Transitions in the Helium-Neon System", J. D. Rigden et al., Proc. IFEE, Jun. 1963, pp. 943-945.
"Characteristics of Important Neutral Gas Lasers", CRC Handbook of Laser Science and Technology, vol. 2, pp. 124-166.
"2s-2p and 3p-2s Transitions of Neon in a Laser Ten Meters Long", R. N. Zitter, J. Applied Physics, vol. 35, Jun. 1964, pp. 3070-3071.
"Population Inversion and Continuous Optical Maser Oscillation in a Gas Discharge Containing a He-Ne Mixture", A. Javan, et al., Physical Review Letters, vol. 6, No. 3, Feb. 1, 1961, pp. 106-110.
"Performance of a Compact 1.523 um HeNe Laser for IR Fiber-Optic Applications, Proceedings of SPIE, vol. 500, p. 131, Aug. 21-22, 1984, San Diego, CA.
"Megahertz Linewidth from a 1.5 um Semiconductor Laser Width HeNe Laser Injection", R. Wyatt, et al., Electronic Letters, vol. 18, No. 7, Apr. 1, 1982, pp. 292-293.
"Continuous Gas Maser Operation in the Visible", A. D. White, et al., Proc. IRE, vol. 50, Jul. 1962, p. 1697.
"Simultaneous Gas Maser Action in the Visible and Infrared", J. D. Rigden et al., Proc. IRE, vol. 50, Nov. 1962, pp. 2366-2367.

Primary Examiner—Gene Wan
Attorney, Agent, or Firm—Knobbe, Martens, Olson & Bear

[57] ABSTRACT

A compact, extended life, gas laser comprises a capillary tube with a transition portion having a reduced wall thickness. The laser includes a cathode which is cylindrical in a rearward cathode region and hemispherical in a forward cathode region. The configuration of the capillary tube and the cathode cooperate to inhibit short circuiting of the bore to cathode discharge path and thereby extend the life of the laser.

21 Claims, 14 Drawing Figures

U.S. Patent  Mar. 10, 1987  Sheet 1 of 3  4,649,545
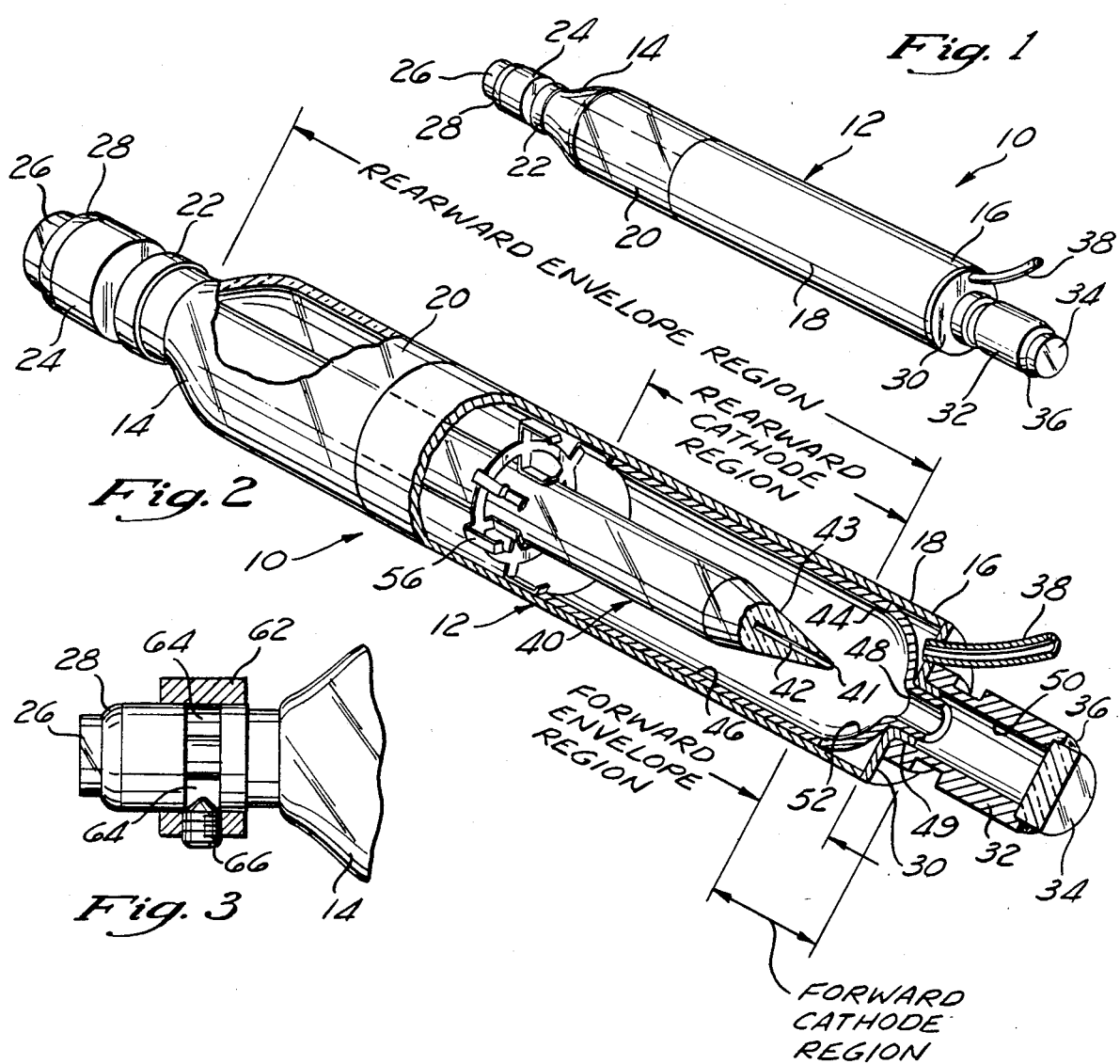
Fig. 1
Fig. 2
Fig. 3
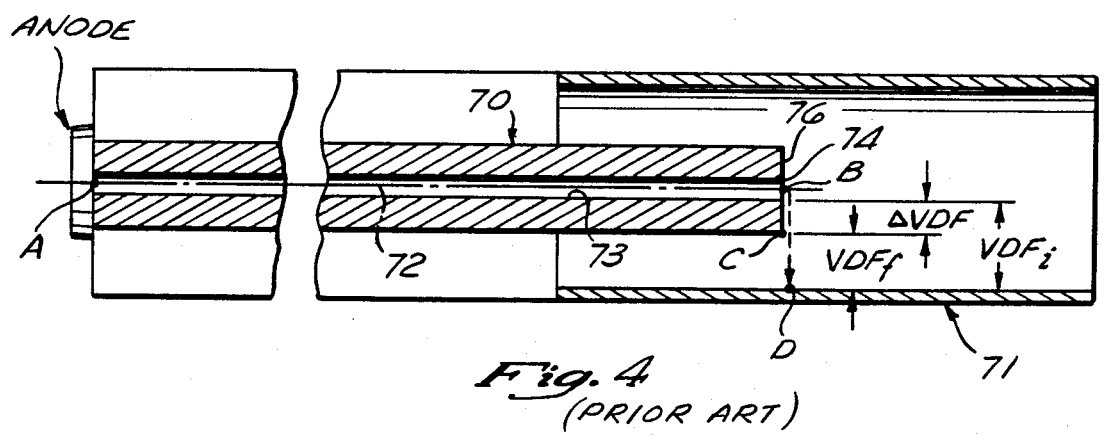
Fig. 4
(PRIOR ART)

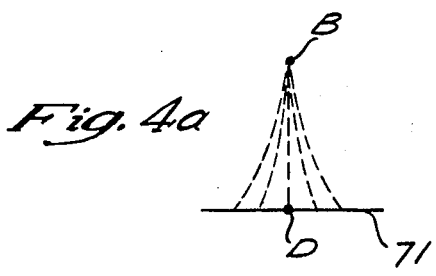
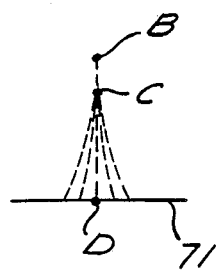
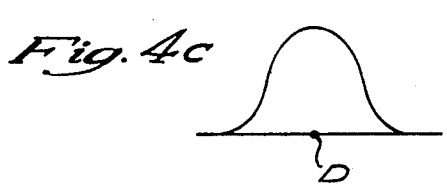
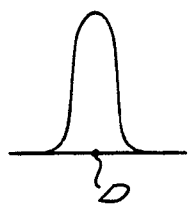
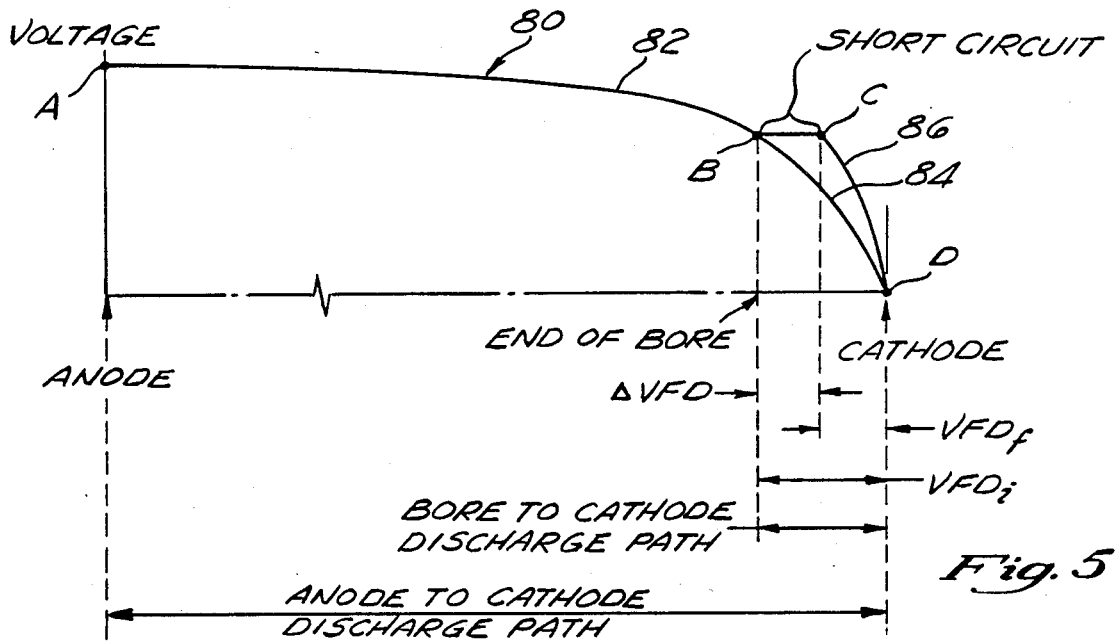
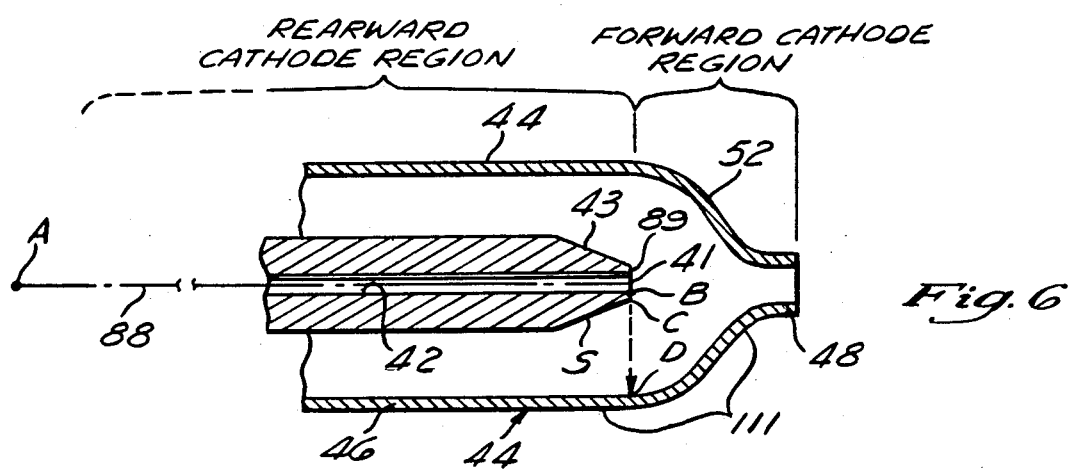

COMPACT GAS LASER HAVING EXTENDED LIFE

BACKGROUND OF THE INVENTION

The present invention relates to gas lasers, and particularly to gas lasers which are compact in size.

Over the past decade, advances in the art have resulted in a reduction in the size of typical gas lasers from diameters on the order of several inches to diameters of about an inch. However, such reduction in size has unfortunately caused a concomitant reduction in the operating life of the laser. In general, it has been found that laser operating lifetimes are an inverse function of laser diameter.

At the present time, reduced operating lifetimes have limited minimum laser size to diameters on the order of about ¾ to 1 inch. Although lasers with diameters of less than ¾ inch will operate, the lifetimes of such lasers are so short as to render them impractical for commercial purposes.

Laser failure ordinarily results from a phenomena commonly referred to as "cathode sputtering" which causes occlusion of the resonator mirrors by deposition of metal from the laser cathode, and/or causes detrimental changes in the operating characteristics of the laser. Thus, there is a need in the art for a gas laser which reduces cathode sputtering so as to extend the laser operating life.

Compact gas lasers are advantageous for a variety of applications, such as gun sites, hand-held bar code readers, and hand-held laser pointers. In addition, a miniaturized laser, if adapted to operate at a wavelength of about 1.5 microns, would be particularly attractive for optical fiber communications, since, as is well known, typical optical fibers exhibit lowest attenutation during transmission at a wavelength of about 1.5 microns.

SUMMARY OF THE INVENTION

The compact laser of the present invention comprises an elongate tubular envelope for containing a laser gas. The laser also includes an anode and a cathode, both of which are disposed in communication with the laser gas. A discharge current is generated in the laser gas by applying a potential difference between the anode and cathode, for example, by means of a DC power supply.

A capillary tube is disposed within the envelope. The tube includes a bore for providing a path for conducting discharge current from the anode. This tube has a first opening adjacent to the anode for placing the bore in communication with the anode, and additionally has a second opening for discharging current from the bore to the cathode along a bore to cathode discharge path. The capillary tube has a reduced wall thickness through a transition portion disposed adjacent to the second opening. In the preferred embodiment, this transition portion is tapered and has a conical configuration. The transition portion extends axially from the second opening towards the first opening, and has an axial length which is substantially greater than the radial wall thickness of the capillary tube at the second opening.

The tapered transition portion reduces the detrimental effects of a phenomena referred to herein as "capillary tube short circuit". The term "capillary tube short circuit" is defined as an electrical short circuit caused by deposition of metal from the laser cathode on the portion of the capillary tube adjacent to the second opening. In effect, the short circuit caused by the metal deposition electrically connects the end of the bore (i.e., the second opening) with the exterior surface of the capillary tube, thereby short circuiting a portion of the bore to cathode current discharge path. To the extent that this short circuit is directed radially towards the cathode, the electrical potential at the end of the bore (i.e. at second opening) will be short circuited to a location closer to the surface of the cathode. This increases the voltage gradient along the bore to cathode discharge path and thus increases the amount of energy dissipated adjacent to the cathode surface. Moreover, to the extent that the short circuit is in a radial direction, the current density at the cathode surface will also be increased. The increase in current density and increased voltage gradient cause a tremendous amount of heat to be generated in a localized area so as to cause increased cathode sputtering and concomitantly decrease the operating lifetime of the laser.

By utilizing a tapered transition portion adjacent to the second opening of the bore, the present invention reduces the detrimental effects of capillary tube short circuit. Due to the taper of the transition portion, any metal deposition thereon will cause the short circuit to be directed at an angle to the radial direction, such that the short circuit has an axial component, as well as a radial component. The conical taper thus decreases the rate of growth of the short circuit in a radial direction, thereby mitigating the effects of the short circuit and extending the life of the laser.

The portion of the capillary tube between the anode and the tapered transition portion preferably has a uniform wall thickness selected to yield sufficient structural strength to prevent the capillary tube from deforming due to heat generated within the laser. The capillary tube configuration of the present invention thus addresses the capillary tube short circuit problem without sacrificing the structural integrity of the tube.

The cathode is tubular and includes a forward cathode region and a rearward cathode region. In the rearward cathode region, the cathode is preferably cylindrical and has a substantially uniform diameter. In the forward cathode region the cathode has a generally hemispherical configuration in the preferred embodiment.

Although the present invention is widely applicable to any laser having potential for capillary tube short circuit problems, the present invention is believed to be particularly applicable for extending the operating lifetimes of compact gas lasers having diameters up to about 1 to 1½ inches. Moreover, it has been found that the present invention significantly extends the life of lasers having diameters less than ¾ inch, so as to make such lasers commercially useful, and provide an entirely new class of compact lasers.

The laser of the embodiment disclosed is quite compact, having a diameter of only about ⅝ inch. The length of this laser is preferably no more than about 7 inches, so as to make its overall dimensions quite small.

In the embodiment disclosed, the envelope includes a heat sink portion, formed of metal, and an insulating portion, formed of glass. The heat sink portion is in thermal communication with the cathode to provide a heat sink for dissipating heat from the cathode. The metal and the insulating material preferably have approximately the same thermal coefficient of expansion.

The laser of the present invention utilizes helium neon gas and may be adapted to operate at various wavelengths, such as 0.6328 microns and 1.523 microns. The 1.523 micron wavelength is particularly attractive for optical fiber communications, since optical fiber losses tend to be at a minimum at such wavelengths. The 0.6328 wavelength, on the other hand, is suitable for a variety of other applications, such as miniaturized bar code readers. Further, the 0.6328 laser transition is particularly strong, and thus, the output power at this wavelength is advantageously quite high.

BRIEF DESCRIPTION OF THE DRAWINGS

These and other features of the present invention may be more fully understood through reference to the drawings in which:

FIG. 1 is a perspective view of the laser of the present invention;

FIG. 2 is a perspective view of the laser of FIG. 1, with a portion of the envelope and cathode cut away to illustrate the mounting arrangement and configuration for the capillary tube, and further showing a portion of the tip of the capillary tube cut away to illustrate its cross-sectional configuration;

FIG. 3 is an elevation view, in partial cross-section, of the anode end portion of the envelope, illustrating the mirror adjustment collar utilized at both the anode and cathode ends of the laser, for selectively deforming the mirror mount to adjust the orientation of the mirrors for reflecting light therebetween to form the resonant cavity of the laser;

FIG. 4 is a schematic drawing illustrating a typical prior art laser configuration, and showing the current discharge path and voltage fall distances associated with this discharge path;

FIGS. 4a and 4b illustrate the discharge current pattern of the laser of FIG. 4 in the absence of a short circuit and in the presence of a short circuit, respectively;

FIGS. 4c and 4d illustrate the current density associated with the discharge current patterns of FIGS. 4a and 4b, respectively;

FIG. 5 is a graph of voltage vs. discharge path length for the prior art laser of FIG. 4, illustrating the manner in which metal deposits on the end face of the capillary tube of FIG. 4 result in a reduction in the voltage fall distance along the bore to cathode discharge path;

FIG. 6 is a schematic drawing illustrating the unique capillary tube and cathode configuration of the preferred embodiment of the present invention;

DETAILED DESCRIPTION OF THE PREFERRED EMBODIMENT

Figure 7:
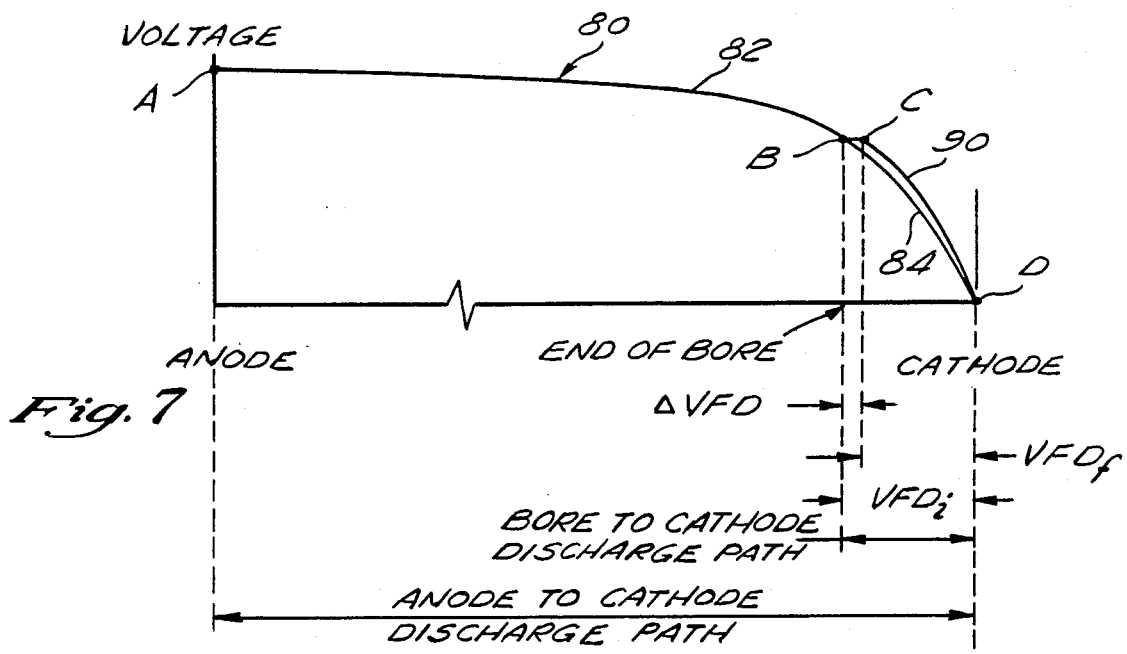
FIG. 7 is a graph of voltage vs. discharge path length, similar to that of FIG. 5, illustrating the manner in which the present invention prevents substantial reduction in the voltage fall distance along the bore to cathode discharge path.

As shown in FIG. 1, the laser 10 of the present invention comprises an elongated tubular envelope 12 having an anode end 14 and a cathode end 16. In the preferred embodiment, the envelope is cylindrical and includes a cathode portion 18 and an anode portion 20. The cathode portion 18 is formed of a material having a high coefficient of thermal conductivity, such as Kovar metal, to provide a heat sink for dissipating heat from the laser 10. The portion 20 of the envelope 12 at the anode end 14, in the preferred embodiment, is formed of an inexpensive insulating material, such as silica glass.

Referring to FIGS. 1 and 2, an anode 22 is sealed to the anode end 14 of the envelope 12. The anode 22 is electrically connected and sealed to a mirror mount 24. A mirror 26 is mounted on and sealed to the mirror mount 24, e.g., by means of solder glass 28. The cathode end portion 16 of the envelope is sealed to an end plate 30 which, in turn, is electrically connected and sealed to a mirror mount 32. A mirror 34 is mounted on and sealed to the mirror mount 32, e.g., by means of solder glass 36. The mirrors 26, 34, mirror mounts 24, 32, anode 22, and end plate 30 cooperate to seal the envelope 12 to provide an enclosed volume for containing a laser gas, which, in the preferred embodiment, comprises helium neon gas. A tube 38, which passes through and is sealed to an aperture in the end cap 30, is provided for the purposes of evacuating air from the envelope 12 and filling the envelope 12 with the helium neon gas. Once the envelope has been filled with the laser gas, the tube 38 is closed, e.g., by crimping. In the embodiment disclosed, the helium neon gas is comprised of $He^3$ and $Ne^{20}$ in a 7 to 1 ratio of helium to neon. Those skilled in the art will understand that other gas mixtures may be used alternatively.

As shown in FIG. 2, an elongate capillary tube 40 is disposed within the envelope 12. This capillary tube 40 has a central longitudinal bore 42 which has a uniform diameter and extends through the entire length of the capillary tube 40. The capillary tube 40 is oriented such that the central longitudinal axis of the bore 42 is coincident with the central longitudinal axis of the envelope 12. At the anode end 14 of the envelope 12, the capillary tube 40 is joined to the envelope portion 20 so that it is cantilever supported thereby. Further, the tube 40 has an opening adjacent to the anode 22, so that the laser gas is in communication with the anode 22. This opening is formed by an enlarged diameter tube portion which is in communication with the bore 42. The capillary tube 40 extends from the anode end 14 towards the cathode end 16. In the preferred embodiment, the tube 40 terminates short of the cathode end 16. At the end of the tube 40, an opening 41 is provided in the bore 42 to allow discharge current from the anode 22 to flow out of the tube 40. The tube 40 also includes a transition portion 43 which extends from this bore opening 41 towards the opening at the anode end 14. In the embodiment enclosed, this transition portion 43 has an outside diameter which gradually tapers towards the opening 41 so as to reduce the outside diameter of the tube 40 at the opening 41 to a diameter close to the diameter of the bore 42. In the embodiment disclosed, the opening 41 is a part of the bore 42, has the same diameter as the bore 42, and is in a plane normal to the longitudinal axis of the envelope, such that it faces in the same direction as the axis of the envelope.

The laser 10 also includes a tubular cathode 44 at the cathode end 16 of the envelope 12. The cathode 44 is a tubular elongate, cylindrical symmetric structure, having a central longitudinal axis which is coincident with the central longitudinal axis of the envelope 12. Those skilled in the art will understand that a cylindrical symmetric structure is a structure in which the radial distance at any point along the longitudinal axis is the same. The cathode 44, in the preferred embodiment, includes a cylindrical portion 46, having a uniform diameter selected such that the outer surface of the cathode portion 46 contacts the heat sink portion 18 of the envelope 12 along its length. The cathode 44 also includes a second generally cylindrical cathode portion 48, which has a reduced diameter relative to the portion 46. Preferably, this portion 48 also has a generally uniform diameter. This cathode portion 48 is sized to fit within a central aperture formed in the end cap 30. The end cap 30 has a flanged portion 49 which forms a collar around the cathode portion 48 to provide good electrical contact therebetween. The flanged collar 49, in turn, fits within a central longitudinal bore 50 in the mirror mount 32, such that the end cap 30 and cathode portion 48 make electrical contact with the mirror mount 32. Interposed between the cathode portion 48 and the cathode portion 46 is a generally hemispherical cathode portion 52, which provides a transition between the larger diameter cylindrical cathode portion 46 and the reduced diameter cylindrical portion 48. The portion 52 is disposed such that the center of the hemisphere is located substantially at the center of the opening 41. The cathode portions 52 and 48 form a "snout-like" funnel-shaped structure which closes off a substantial portion of one end of the cathode 44. As shown in FIG. 2, for the purpose of reference hereinafter, the envelope 12 is divided into a forward envelope region and a rearward envelope region. The forward envelope region comprises the portion of the envelope between the opening 41 in the capillary tube 40 and the cathode end 16. The rearward envelope region comprises the portion of the envelope between the opening 41 and the anode end 14. Thus, the laser 10 may be viewed as being divided into two parts by an imaginary plane normal to the central longitudinal axis, disposed at the opening 41. This plane also divides the cathode 44 into a forward cathode region, disposed in the forward envelope region, and a rearward cathode region, disposed in the rearward envelope region.

The capillary tube 40 extends into the cathode 44 such that the opening 41 of the bore 42 is disposed adjacent the juncture of the larger diameter cathode portion 46 and the transition or hemispherical cathode portion 52. Thus, in the embodiment shown, the cathode 44 surrounds the capillary tube 40 exclusively through the length of the large diameter cathode portion 46. Depending on the overall length of the capillary tube 40, it may be preferable to support the capillary tube intermediate its ends, e.g., by means of a spider structure 56, such that the capillary tube extends towards the cathode end 16 from the spider 56 in cantilever fashion.

The mirror mount 24, at the anode end of the envelope 12, includes a central longitudinal bore (not shown), similar to the central longitudinal bore 50 of the mirror mount 32 at the cathode end. The central longitudinal axes of these bores are coincident with the central longitudinal axis of the envelope, so as to form an optical path through the laser between the mirrors 26, 34. The mirrors 26, 34 are spaced to form a resonant cavity for light propagating along the optical path. Those skilled in the art will understand that, to form such a resonant cavity, the mirrors must be aligned in parallel relationship to fairly precise tolerances. To facilitate such alignment, the laser of the present invention includes a mirror alignment collar 62, as shown in FIG. 3. Such collar 62 is mounted on both the mirror mounts 24, 32, however, for purposes of illustration, only the collar 62 on the mirror mount 24 is shown. The collar 62 is disposed on the exterior of the mirror mount 24 adjacent to an annular slot 64, formed in the exterior surface of the mirror mount 24. The collar includes a series of set screws 66, spaced around the collar, e.g. at 120° intervals, such that the set screws 66 may be driven into the annular slot 64. The set screws 66 are slightly larger than the slot 64, and have a conically tapered end. Thus, by driving one of the set screws into the slot 64, the conical end of the set screw will spread the portion of the slot adjacent thereto, while causing corresponding narrowing of the slot on the opposite side thereof. Accordingly, by manipulating selected ones of the set screws 66, the orientation of the mirror may be properly adjusted. Additional details as to certain aspects of the above-described laser construction may be found in U.S. Pat. No. 4,311,969, which is owned by the assignee of the present invention, and which is hereby incorporated herein by reference.

The principles of laser operation are well known in the art, and thus, will be only briefly described. The laser 10 is energized by applying a potential difference (voltage) between the anode 22 and cathode 44. Since the anode is electrically connected to the mirror mount 24, and the cathode is electrically connected to the mirror mount 32, the mirror mounts 24, 32 may serve as terminals for application of the potential difference. In the preferred embodiment, the potential difference or voltage is generated by a DC power supply (not shown). Application of such voltage between the anode 22 and cathode 44 causes ionization of the laser gas within the envelope 12. Accordingly, a discharge current flows from the anode 22, through the bore 42 of the capillary tube 40, to the inner surface of the cathode 44. Conversely, electrons from the cathode material flow through the laser gas to the bore opening 41, and through the bore 42 to the anode 22.

The discharge current excites atoms of the laser gas to a higher energy state, in accordance with well known laser principles. The excited atoms then relax to a lower energy level during which time they emit photons (light particles) having a wavelength characteristic of the difference between the energy levels. Although laser gases typically emit such photons at a variety of wavelengths, the laser may be adapted to cause preferential emission at a particular wavelength by coating the mirrors with a reflective coating which preferentially reflects light at the desired wavelength. The reflected photons cause emission of additional photons at the same wavelength in accordance with a phenomena commonly referred to as "stimulated emission". This causes light of the desired wavelength to preferentially build up in the resonant cavity of the laser, and thereby stimulates emission from the laser gas at the desired wavelength. Such laser coatings are well known in the art and are in widespread use.

The laser 10 of the present invention has a capillary tube configuration which uniquely cooperates with the configuration of the cathode to extend the life of the laser. Although the preferred embodiment of the invention, shown in FIG. 2, utilizes a pencil point-like configuration for the capillary tube, other types of configurations may be used alternatively, as will be more fully understood from the discussion hereinafter.

While a complete theory of the operation of the present invention has not yet been fully developed, sufficient experimentation and analysis has been conducted to yield a simplified explanation of some of the key principles which contribute to extended laser life. These principles are best understood by comparing the operation of an exemplary prior art laser with the laser of the preferred embodiment. Such comparison will be developed through reference to FIGS. 4-7. Although those skilled in the art will recognize that the discussion associated with FIGS. 4-7 may be somewhat oversimplified in that there may be additional contributing factors which are not presently understood, such discussion represents the best presently available physical explanation as to the manner in which the unique capillary tube and cathode configuration cooperate to provide extended laser life.

One exemplary type of prior art laser construction is shown schematically in FIG. 4. A capillary tube 70 is formed as a generally uniform diameter cylindrical member, and a cathode 71 is also formed as a cylindrical member, with a generally uniform diameter. Tests have shown that the prior art laser construction illustrated in FIG. 4 works well for large diameter lasers. However, for small diameter lasers (e.g., on the order of 1½ inches or less), the configuration of FIG. 4 causes the operating life of the laser to be decreased. Typically, such failure results from excessive "sputtering" of the cathode. Cathode sputtering is a phenomena in which ions bombard the cathode surface such that small metal particles are ripped from the cathode surface. These metal particles tend to deposit on cooler surfaces of the laser, such as the mirrors. If the sputtering is excessive, such metal deposits will quickly occlude the mirrors, thereby preventing light from being output from the laser, and causing the laser to fail.

Although there are several factors which contribute to cathode sputtering, one of the most important factors is the power dissipation at or near the cathode surface. Such power dissipation generates heat which raises the temperature of the cathode and makes the cathode more susceptible to sputtering. Another important factor is the current density on the cathode surface. In general, the amount of sputtering increases as the current density increases.

As shown in FIG. 4, the laser discharge current, represented by the dashed line 72, originates at the anode (i.e., at point A in FIG. 4), and flows through the bore 73 of the capillary tube 70 to an opening 74 at the end of the capillary tube 70 (i.e. to point B). When the current reaches the opening 74 at the end of the capillary tube bore 73 (i.e., reaches point B in FIG. 4), the discharge current 72 will flow to the cathode surface through the path of least resistance. Ordinarily, the path of least resistance will be the shortest path between the opening 74 at the end of the bore 73 and the cathode 71, and thus, for the particular cylindrical cathode configuration depicted, the current 72 will tend to flow radially from the end of the bore 73 to the cathode surface, as illustrated by the portion of the dotted line 72 extending from point B to point D. Thus, the discharge current path ABD represents the preferential current discharge path, and the length of the path ABD represents the minimum current discharge path length. Although, for simplicity of illustration, the discharge path ABD has been shown as terminating at a single point D, those skilled in the art will understand that the illustrated discharge path may terminate at any point along an annular ring on the cathode 71 passing through the point labeled D, due to the fact that the opening 74 of the bore 73 is spaced equidistantly in all radial directions from the cathode 71. In addition, those skilled in the art will understand that in actual practice, the ionized laser gas may cause some intermittent changes in the path of least resistance between the bore opening 74 and the cathode 71, and thus, the discharge current 72 will not always follow the minimum path length ABD. However, the minimum distance path ABD does represent the preferential discharge path and the current 72 will ordinarily follow this path.

Referring now to FIG. 5, the voltage along the current discharge path ABD is illustrated by the curve 80. Those skilled in the art will understand that the curve 80 is exemplary only, and that the voltage along the discharge path is dependent on a variety of laser parameters which may very from laser to laser. For the exemplary curve 80, the voltage gradually decreases along the current discharge path as the current flows from the anode (point A) to the cathode (point D). Between the anode (point A) and the end of the capillary tube bore (point B), the decrease in voltage, illustrated by the curve portion 82, is relatively small. However, as the current flows from the end of the capillary tube bore (point B) to the cathode (point D), the voltage decrease, represented by the curve portion 84, is relatively large. Thus, for the exemplary curve 80, the portion of the discharge path between points A and B has a relatively low voltage gradient while the portion of the discharge path between points B and D has a relatively high voltage gradient. The relatively high voltage gradient between points B and D is caused by the fact that during operation of the laser, a plasma is formed which provides a conductive path for the discharge current. The electrical resistance of this plasma is substantially greater along the discharge path portion BD than along the discharge path portion AB, thus causing the voltage to fall more rapidly along the path portion BD. Because of the high voltage gradient along the path portion BD, there is a substantial amount of power dissipated in this portion of the discharge current path. For purposes of references hereinafter, this path portion BD between the bore opening (point B) and the cathode surface (point D) will be referred to as the "bore to cathode discharge path". The distance over which the voltage drop occurs as the current 72 flows from the bore opening 74 to cathode 71 along the bore to cathode discharge path BD will be referred to as the "voltage fall distance", which is a newly coined term that should be distinguished from the well known term "cathode drop distance." The "cathode drop distance" is approximately equal to the distance over which rapid decrease in voltage occurs (e.g.,the portion of the curve 80 where the slope increases rapidly). Those skilled in the art will recognize that the "cathode drop distance" for the exemplary curve 80 is approximately equal to the distance BD in FIG. 5. In any case, care should be exercised in distinguishing "voltage fall distance" from "cathode drop distance" since, although these distances might be equal, they are not necessarily equal. For example, in large diameter lasers, the "voltage fall distance" is typically substantially larger than the "cathode drop distance".

It has been found that the voltage fall distance is dependent not only upon the bore to cathode discharge path length (points B to D), but also upon a newly discovered phenomena, referred to herein as "capillary tube short circuit". This phenomena may be best understood through reference to an example. Assume, in this example, that the laser of FIG. 4 is operating in accordance with the curve 80 of FIG. 5. During initial operation of the laser, the voltage fall distance through the bore to cathode discharge path (i.e., between points B and D) will be equal to the distance between points B and D. This initial voltage fall distance is represented in FIGS. 4 and 5 by the portion of the X axis labeled "VFD$_i$". As operation of the laser continues, some sputtering will occur due to the fact that the distance between points B and D is quite small. Initially, the sputtering is not excessive, and does not result in occlusion of the mirrors, or other adverse affects. It has been found that the sputtered particles tend to initially deposit themselves on the annular end face 76 of the capillary tube 70, because of the proximity between the end of the capillary tube and the bore to cathode discharge path BD. Over a period of time, sputtering coats the annular end face 76 of the capillary tube 70, between points B and C in FIG. 4, such that this annular face 76 is completely covered with a metal film. Such coating results in short circuit in a radial direction, between the points B and C, such that the voltage is the same at both points. As shown in FIG. 5, this short circuit causes a change in the shape of the voltage curve 80, such that the curve 80 follows a portion 86 between the points B and D, rather than the portion 84. The curve portion 86 illustrates that the voltage maintains a constant level between the points B and C, and thereafter falls very rapidly to point D at the cathode surface. The short circuit between points B and C results in a shortening of the initial voltage fall distance (VFD$_i$) to a final voltage fall distance (VFD$_f$) such that the final voltage fall distance (VFD$_f$ in FIGS. 4 and 5) is equal to the length of that portion of the bore to cathode discharge path BD between points C and D. Thus, the initial voltage fall distance (VFD$_i$) is shortened by an amount $\Delta$VFD. In effect, the short circuit between points B and C moves the relatively steep portion 84 of the curve 80 to the right in FIG. 5, such that the voltage follows the curve portion 86. Since the curve portion 86, between points C and D, has an increased slope relative to the curve 84, the voltage gradient through the path CD (FIG. 4) will increase significantly. Note that the increase in slope, and thus the increase in voltage gradient is dependent on both the magnitude of $\Delta$VFD and on the location of the point B. For example, if the laser of FIG. 4 were designed such that the point B was located on a relatively flat part of the curve 80, a given change in the voltage fall distance ($\Delta$VFD), would not yield as great of change in slope, and thus would not cause as great of an increase in voltage gradient between points C and D. In general, the location of the point B on the curve 80 is a function of the bore to cathode distance BD. Thus, if the laser is relatively small in diameter, the point B tends to be on a relatively steep part of the curve 80, and if the laser is relatively large in diameter, the point B tends to be on a relatively flat part of the curve 80. Accordingly, the capillary tube short circuit problem is more troublesome for small diameter lasers than for large diameter lasers. In any case, any capillary short circuit of sufficient magnitude to significantly translate the curve 80 to the right in FIG. 5 so as to increase its slope between points C and D will result in an increase in the voltage gradient along the path CD (FIG. 4). Such increase in the voltage gradient causes increased power dissipation at or near the cathode surface. The dissipated power causes the cathode to increase in temperature, which increases the sputtering of the cathode 71.

In addition, by shorting the path portion BC of the path BD, the discharge current density tends to increase. This may be more fully understood through references to FIGS. 4a and 4b. FIG. 4a schematically illustrates the discharge current (represented by the dashed lines) in the absence of the short circuit, while FIG. 4b illustrates the discharge in the presence of the short circuit. Comparing FIG. 4a with FIG. 4b, it may be seen that, when the short circuit is present, the discharge current follows paths which are closer to the preferential discharge current path BD than when the short circuit is not present. The current density at the cathode surface associated with the discharge current patterns of FIGS. 4a and 4b are shown in FIGS. 4c and 4d, respectively. As illustrated, the current density is substantially higher for the current discharge pattern of FIG. 4b than for the current discharge pattern of FIG. 4a. The increased current density is deleterious to the cathode, and causes increased sputtering.

From the foregoing, it will be understood that, once metal deposition on the end of the cathode begins, such metal deposition increases the sputtering, which in turn, increases the metal deposition which further increses the sputtering. Thus, the metal deposition process has an "avalanching" effect which continues until the entire end face of the capillary tube is electrically shorted.

Because the lifetime of lasers is a function of the amount of sputtering, the short circuit results in premature laser failure. It should be noted, however, that the short circuit has a deterious effect only to the extent that it is directed radially towards the cathode. Thus, by decreasing the rate of growth of the short circuit in the radial direction, the laser lifetime may be extended.

The present invention addresses the foregoing problems by configuring the capillary tube 40 to include the transition portion 43 of reduced wall thickness. The reduced wall thickness effectively decreases the amount of radially directed surface area available for metal deposition. In the preferred embodiment, the transition portion 43 conically tapers to a pointed tip. Since this tip presents only a very small surface area, metal deposition on this tip does not short circuit the bore to cathode discharge path by a substantial amount. Moreover, in the event that the short circuit migrates from the tip along the sides of the tapered transition portion, such migration of the short circuit will tend to be directed at an angle from the radial direction such that the short circuit has a longitudinal component as well as a radial component. In effect, for a laser of a given diameter, the tapered sides of the transition portion increase the time required for any short circuit on the tapered sides to migrate in a radial direction, thereby inhibiting sputtering and extending the life of the laser.

FIG. 6 schematically illustrates the capillary tube 40 and cathode 44 of the present invention. A discharge current, represented by the dashed line 88, flows from the anode 22 (schematically represented by the point A in FIG. 6), through the bore 42 of the capillary tube 40, and out of the bore opening 41 to the cathode 44. The discharge current 88 is represented in FIG. 6 as following a discharge current path ABD. This path ABD corresponds to the path ABD previously described in FIG. 4. Thus, point B is at the opening 41, and point D is on the surface of the cathode 44, radially disposed from the point B. The portion of the dashed line between points B and D, therefore, represents the bore to cathode discharge path. The transition portion 43 of the tube 40 includes an annular end face 89 adjacent to the opening 41, having a thickness equal to the distance between points B and C in FIG. 6. The end face 89 of the tube 40 lies in a plane normal to the longitudinal axis of the bore 42, and therefore, the points B and C lie in the radial bore to cathode discharge path BD. Thus, the entire annular end face 89 is susceptible to the metal film deposition problem discussed in reference to FIG. 4. Such metal film causes "capillary tube short circuit" to occur between the points B and C. Unlike the capillary tube 70 of FIG. 4, the capillary tube 40 of the present invention is tapered through the transition portion 43 so that the end face 89 has a comparatively small thickness, and presents a relatively small surface area for metal deposition. Thus, the capillary tube short circuit between parts B and C in FIG. 6 covers a substantially shorter distance than the capillary tube short circuit in the device of FIG. 4.

The voltage along the anode to cathode discharge path ABD for the device of FIG. 6 is shown in FIG. 7. Thus, the voltage along the discharge path ABD of the laser of FIG. 6 initially follows the same portions 82, 84 of the curve 80, discussed in reference to FIG. 5. The voltage gradually decreases through the curve portion 82 between the points A and B, and thereafter decreses more rapidly through the curve portion 84, between the points B and D. Thus, the device of FIG. 6 has the same initial voltage fall distance (VFD$_i$) as the device of FIG. 4. However, after the metal deposits form on the end face 89 of the device of FIG. 6, the voltage follows a curve portion 90. Comparing FIG. 5 with FIG. 7, it will be seen that the curve portion 90 (FIG. 7) is substantially closer to the initial curve 84 than is the curve 86 (FIG. 5). The curve portion 90 illustrates that the voltage is maintained at a constant level for a very short distance, between points B and C, and thereafter drops through a final voltage fall distance (VFD$_f$), which is very close to the initial voltage fall distance (VFD$_i$). Thus, the pointed tip on the capillary tube of FIG. 6 prevents substantial changes in the voltage fall distance due the short circuit caused by metal deposits on the end face 89 of the capillary tube 40, thereby extending the life of the laser. It should be noted that the above described technique is most effective on extending the laser lifetime when the bore to cathode discharge path length is relatively small, such that point B is on a relatively steep portion of the curve 80, rather than on a relatively flat portion. This suggests that the invention is most effective where the bore to cathode distance BD is within about 1.5 times the cathode drop distance. Tests on the preferred embodiment of the present invention indicate that laser lifetime increases in a generally exponential fashion as the minimum bore to cathode distance increases from about 0.2 inches to 0.4 inches. These tests indicate that, in the preferred embodiment, the invention yields the best results when the bore to cathode distance BD is less than 0.4 inches and greater than 0.2 inches.

From the foregoing, it will be apparent that it is important to configure the end portion 43 so that the tapered side surface, labeled "S" in FIG. 6, is disposed away from the bore to cathode discharge path between points B and D.

After a period of time, the short circuit on the end face 89 may migrate along the tapered side surface S of the transition portion, particularly if the laser is small in diameter. However, due to the taper of the transition portion, much migration of the short circuit will extend in a radial direction by only a fraction of the length of the short circuit. Thus, the tapered transition portion thus acts to inhibit growth of the short circuit in a radial direction.

Those skilled in the art will understand that the present invention may be implemented utilizing a variety of configurations for the transition portion. For example, rather than utilizing a conically tapered transition portion, the tube may be configured to abruptly reduce in diameter to provide a uniform diameter, uniform wall thickness, transition portion. This configuration is advantageous in that metal deposition on the sides of the transition portion would direct the short circuit solely in an axial direction. The conically tapered transition section is used in the preferred embodiment primarily because it provides enhanced rigidity and sturdiness, and is easy to manufacture.

Figure 8:
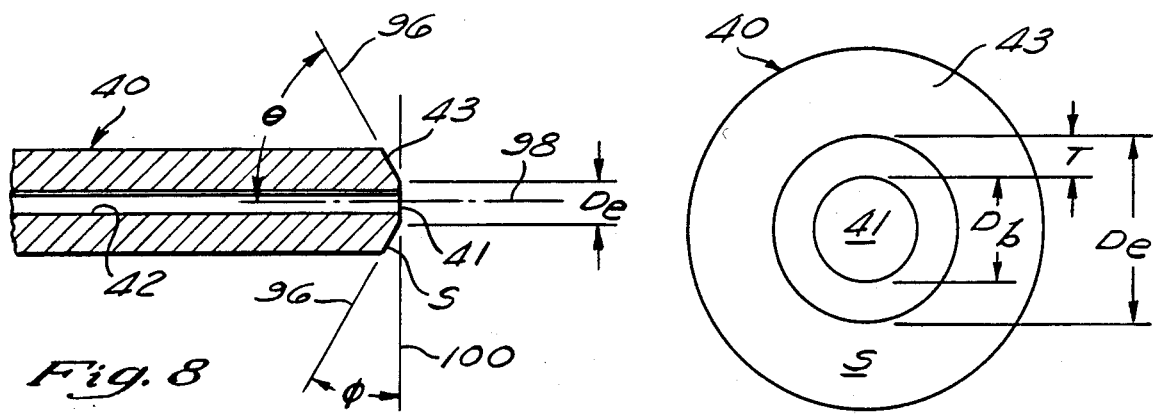
FIG. 8 a schematic drawing illustrating the preferred geometry of the capillary tube of the present invention.
Figure 9:
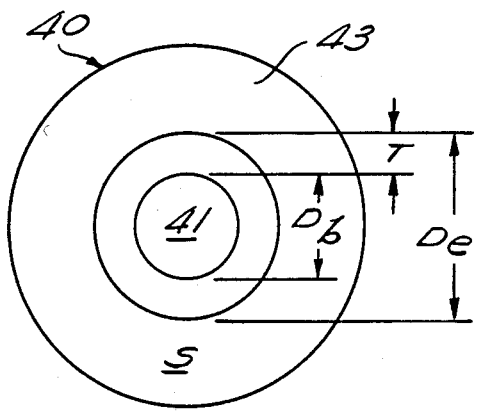
FIG. 9 is a schematic drawing of the annular end face of the capillary tube shown in FIG. 9, illustrating the dimensions thereof.

An exemplary geometry for the capillary tube 40 of the present invention is illustrated schematically in FIGS. 8 and 9. As shown in FIG. 8, the transition portion 43 of the capillary tube 40 lies entirely within an imaginary right circular cone 96 having an axis coincident with the longitudinal axis 98 of the bore 42. The cone has a cone angle $\theta$, measured from the longitudinal axis 98 to one of its sides, which is preferably no more than 60°. Such a configuration places the side surface S of the end portion 43 at a safety angle $\phi$ of at least 30° from the radial current discharge path BD (FIG. 6), represented by the plane surface 100 in FIG. 8. Although the above described configuration is workable, smaller cone angles $\theta$ will, of course, provide a greater safety angle $\phi$, and thus, a higher safety margin against deposition of metal on the surface S. Accordingly, it is advantageous to taper the transition portion 43, so that it lies within a much smaller angle $\theta$, so as to generate a much larger angle $\phi$. In the preferred embodiment, the angle $\theta$ is about 15°, the angle $\phi$ is about 75°, and the axial length of the transition portion 43 is about 0.6 inch.

In addition, the diameter of the cone 96 at the opening 41 is preferably no more than about 0.125 inch ($\frac{1}{8}$"), so that the overall diameter D$_e$ of the end face 89 (FIG. 6) is no more than 0.125 inch. As shown in FIG. 9, the end face diameter D$_e$ on the bore diameter D$_b$ and the thickness T of the capillary tube material at the opening 41. Thus, the overall diameter D$_e$ is equal to the bore diameter D$_b$ plus twice the thickness T of the annular material surrounding the opening 41. It is, of course, advantageous to make the end face diameter D$_e$ small, and, in the preferred embodiment, the bore diameter is about 0.037 inch, the thickness of the material at the opening 41 is about 0.0115 inch, thereby yielding an overall diameter for the end face 89 of about 0.060 inch.

Referring again to FIG. 6, the cathode 44 of the present invention is configured to inhibit significant excursions of the bore to cathode discharge current 88 into the rearward cathode portion (FIG. 2). Such excursions of the current 88 into the rearward cathode portion would place the bore to cathode discharge path closer to the surface S, thereby making the surface S susceptible to metal deposition. Accordingly, the cathode 44 of the present invention is configured to inhibit discharge current flow along the exterior side surface S of the transition portion, by causing the current flow to be preferentially directed along a path angularly disposed from the longitudinal axis of the capillary tube by at least about 90°. In the preferred embodiment, the cathode portion 46, which is in the rearward cathode region (FIG. 2), is cylindrical and of uniform diameter. Thus, the distance between any point on the rearward cathode portion 46 and the point C will be greater than the radial distance between points C and D. Since the discharge current 88 ordinarily follows the path ABD of least distance, significant excursions of the discharge current 88 into the cathode portion 46 will thereby be reduced or prevented.

Although discharge current flow to the cathode portion 46 in the rearward cathode region (FIG. 2) is not desirable in the present invention, excursions of the discharge current 88 into the forward cathode region (FIG. 2) are advantageous, if properly controlled. Accordingly, the cathode 44 of the present invention utilizes the generally hemispherical cathode portion 52 to encourage current discharge excursions into the forward cathode region. The hemispherical cathode portion 52 is configured such that the bore to cathode discharge path length is substantially the same at all points thereon. Thus, the opening 41 is disposed substantially at the center of an imaginary sphere, one hemisphere of which is substantially coincident with the inner surface of the hemispherical cathode portion 52. Since the inner surface of the hemispherical portion 52 is generally equidistantly spaced from the opening 41, the discharge current tends to be distributed throughout such surface, thereby providing a more uniform current density on the cathode, and concomitantly reducing cathode sputtering. Distribution of the discharge current throughout the surface of the hemispherical portion 52 is additionally advantageous in that it at least intermittently tends to cause the discharge current flow to be further away from the surface S, and thus, decreases the opportunity for metal deposition on the side surface S.

Preferably, the portion of the hemispherical cathode surface 52 adjacent to the cylindrical cathode end portion 48 deviates slightly from a hemispherical shape, such that it is displaced further from the opening 41 than the remaining portions of the hemispherical cathode surface 52. Such displacement insures that the discharge current will not flow into the tubular opening formed by the cathode portion 48, and thence into the bore 50 (FIG. 2) of the mirror mount 32. As is well known in the art, mirror mounts are typically formed of materials which cannot withstand discharge current flow, and which sputter readily when exposed to discharge current. Accordingly, the cathode 44 should preferably be configured to prevent any discharge current flow to the bore 50.

Figure 10:
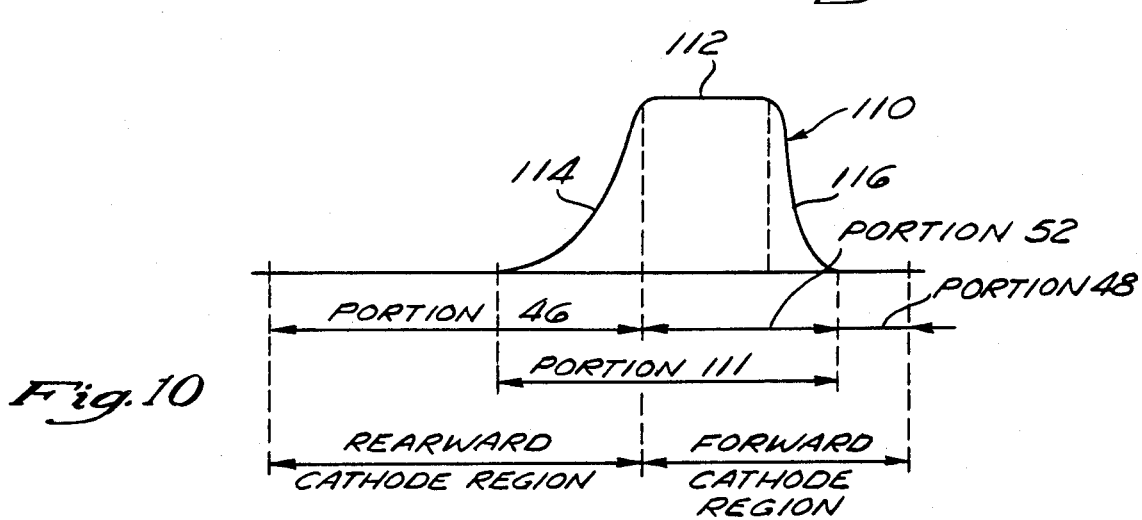
FIG. 10 is a graph of the current density along the surface of the cathode of FIG. 6.

From the foregoing, it will be apparent that the cathode configuration shown in FIG. 6 causes the discharge current to preferentially flow to the forward cathode region (FIG. 2), to inhibit discharge current flow to the rearward cathode region (FIG. 2). For any given point on the cylindrical cathode portion 46, the current density at that point decreases as the distance between such point and the juncture of the forward and rearward cathode regions (FIG. 2) increases. Additionally, for a given point on the hemispherical cathode portion 52, the current density remains generally uniform, as the distance between that point and the juncture of the forward and rearward cathode regions (FIG. 2) increases. As shown in FIG. 10, the current density follows a generally bell-shaped curve 110 which extends through the current receiving surface portion 111 (FIGS. 6 and 10) of the cathode 44. The curve 110 has a flat top portion 112, representing the substantially uniform current density in the hemispherical portion 52. The bell-shaped curve 110 has a side portion 114, representing the current density in the cathode portion 46.

The curve portion 114 illustrates that the current density falls off very rapidly towards zero in the cathode portion 46, as the distance from the hemispherical cathode portion 52 increases. The bell-shaped curve 100 has a second side portion 116, representing the current density in that portion of the hemispherical cathode portion 52 which is immediately adjacent to the cathode portion 48. As illustrated, the current density decreases rapidly along the curve 116, such that the current density is substantially zero at the cathode portion 48. The cathode configuration of the present invention thus provides a current density distribution which results in the preferential flow of current to the forward cathode region and inhibits current flow to the rearward cathode region, thereby insuring that the bore to cathode current discharge path is preferentially directed away from the surface S of the capillary tube end portion 43 (FIG. 6). Although the above-described cathode configuration is preferred, those skilled in the art will understand that the invention may also be implemented utilizing a cathode in which both the forward and rearward cathode regions are cylindrical.

The cathode 44 of the preferred embodiment is formed of sheet aluminum which is oxidized on the interior surface thereof. The thickness of such sheet aluminum is about 1/32 of an inch, and thus, the total cross sectional thickness of the cathode accounts for about 1/16 of the total cross sectional diameter of the laser. The thickness of the cathode may be significantly reduced, however, by utilizing an alternative technique to form the cathode. This technique involves the deposition of a cathode metal film on the interior surface of the metal heat sink envelope portion 18 (FIG. 2) utilizing well known metal deposition techniques such as sputter metalizing. Such metal films may be made extremely thin, e.g., in the sub-micron range, typically 0.05–0.08 microns. By forming the cathode as a metal film, the thickness of the cathode 18 is practically negligible, thereby advantageously allowing the overall diameter of the laser to be reduced without reducing the radial bore to cathode distance.

Returning to FIG. 2, it will be seen that the cathode 44 is in contact with the heat sink portion 18 of the envelope 12 throughout the length of the cathode portion 46. Such contact provides thermal communication between the cathode 44 and heat sink portion 18, such that the portion 18 dissipates heat from the cathode 44. In the preferred embodiment, the heat is dissipated from the heat sink portion 18 by the surrounding ambient atmosphere, although it will be understood that more sophisticated cooling techniques may be utilized. In any case, the purpose of dissipating heat from the cathode is to make the cathode less susceptible to sputtering.

As previously disclosed, the heat sink envelope portion 18 is preferably formed of metal, such as Kovar. Although this metal serves as an excellent thermal conductor, it is additionally advantageous in that it has high structural strength, thereby allowing the metal envelope portion 18 to be quite thin so as to decrease the overall diameter of the laser. In the preferred embodiment, the metal envelope portion 18 has a sheet metal thickness of about 0.030 inch (i.e., about 1/32 inch). Kovar is a preferred metal, since it has a coefficient of thermal expansion approximately equal to that of the glass material forming the insulation portion 20 of the envelope 12.

Although the concepts utilized in the present invention are generally applicable to all lasers which are susceptible to capillary tube short circuit, the invention is particularly advantageous for the manufacture of small diameter lasers, which have relatively short bore to cathode discharge paths, for example, lasers having an outside diameter on the order of ¾ inch or less. In the preferred embodiment, the laser envelope 12 has an overall exterior diameter of ⅝ inch, which is generally uniform along its length. Since the thickness of the envelope material (approximately 1/32 inch) and thickness of the cathode material (about 1/32 inch) account for about ⅛ inch of the total laser diameter in the preferred embodiment, the radial distance BD (i.e., the bore to cathode discharge path) is about one-quarter of an inch. The end face of the tube 40 of the preferred embodiment has a diameter about 1/16 inch, and thus, the distance CD is about 7/32 of an inch.

The laser 10 of the present invention may be adapted to operate at various wavelengths. In one preferred embodiment, the laser 10 is adapted for operation at a wavelength of 0.6328 microns. For this neon laser emission, the threshold gain width is about 1.7 GHz. The threshold gain width defines the extent of the gain curve which is above the lasing threshold. To allow single-mode operation i.e. oscillation in a single longitudinal mode), the length of the resonant cavity (i.e., the distance between the mirrors 26, 34) should preferably be less than or equal to about 17.8 centimeters (about 7 inches). The bore diameter of the preferred embodiment is about 0.037 inches, and the laser 10 has a PD constant (bore diameter times laser gas pressure) of about 3.6 to 4.0 torr-millimeters. Helium neon gas also yields laser transitions at various other wavelengths, such as 1.523 microns, and thus, the laser 10 may also be adapted for operation at these wavelengths.

In the case of the 1.523 micron wavelength, the threshold gain width is 0.6 GHz, and a resonant cavity length of about 50 cm (about 19.7 inches) or less is preferred to allow single-mode operation. At this 1.523 micron wavelength, it has been found that significantly higher pressures are required than in the case of the 0.6328 wavelength. The optimum PD constant for the 1.523 micron wavelength is substantially higher than the optimum PD constant for the 0.6328 wavelength, and is generally in the range of 10–30 torr-mm for a $HE^3/Ne^{20}$ mixture. In the preferred embodiment, with a 7:1/$He^3$:$Ne^{20}$ mixture, however, a PD constant of 14–16 torr-mm is utilized, as this yields maximum output power. It was found that the higher PD constant causes the 1.523 micron transition to be homogeneously broadened, so that single mode output can be obtained for a resonant cavity length longer than the length suggested by the threshold gain width.

The present invention thus significantly extends the lifetime of lasers and provides an entirely new class of compact lasers, which are significantly smaller than presently available lasers, and suitable for operation at several wavelengths.

What is claimed is:

1. A gas laser, comprising:
   an elongate envelope for containing a laser gas;
   an anode, in communication with said gas;
   a tubular cathode, having a discharge current receiving surface for receiving discharge current from said anode in communication with said gas;
   means for applying a potential difference between said anode and said cathode to generate said discharge current in said gas;
   a capillary tube, disposed in said envelope, having a bore for providing a path for conducting said discharge current from said anode, said tube having a first opening adjacent to said anode for placing said bore in communication with said anode, and a second opening for discharging said current from said bore to said cathode, said tube having a reduced wall thickness through a transition portion adjacent to said second opening, said transition portion having an axial length greater than the radial wall thickness of said tube at said second opening; and
   said cathode including a forward cathode region and a rearward cathode region, the current-receiving surface of said cathode in said rearward cathode region being substantially cylindrical and having a substantially uniform diameter.

2. A gas laser, as defined by claim 1, wherein the portion of said bore in said transition portion has a uniform diameter.

3. A gas laser, as defined by claim 2, wherein said forward cathode region includes a cathode portion having a generally hemispherical configuration.

4. A gas laser, as defined by claim 1, wherein the wall thickness of said capillary tube is smallest at said second opening.

5. A gas laser, as defined by claim 4, wherein said transition portion conically tapers towards said second opening.

6. A gas laser, as defined by claim 1, wherein a portion of said envelope is formed of metal which is in thermal communication with said cathode to provide a heat sink for dissipating heat from said cathode.

7. A compact gas laser, as defined by claim 6, wherein said cathode comprises a coating deposited on said metal.

8. A compact gas laser, as defined by claim 7, wherein another portion of said envelope comprises an insulating material, joined to said metal, said metal and said insulating material having substantially the same thermal coefficient of expansion.

9. A gas laser, as defined by claim 1, wherein the minimum distance between said bore and said cathode is no more than about 0.4 inch.

10. A gas laser, as defined by claim 1, wherein said envelope has a maximum diameter of about ⅝ inch.

11. A gas laser, as defined by claim 10, wherein the length of the resonant cavity of said laser is no more than about 7 inches.

12. A gas laser, as defined in claim 1, wherein said means for applying a potential difference comprises a DC power supply.

13. A gas laser, as defined by claim 1, wherein said laser gas in said envelope is comprised of a mixture of helium and neon under a pressure such that the product of the total gas pressure and the capillary tube bore diameter has a value between 10 and 30 torr-millimeters to adapt said laser to emit light at a wavelength of about 1.5 microns.

14. A gas laser, as defined by claim 1, wherein the minimum distance between said bore and said cathode is no more than about 1.5 times the cathode drop distance of said laser.

15. A gas lasaer, as defined by claim 1, wherein said transition portion lies entirely within a right circular cone having an axis coincident with the axis of said bore and a cone angle of no more than 60°, said cone having a cross-sectional diameter at said second opening of no more than 0.125 inch.

16. A gas laser, comprising:
an elongate, tubular envelope, for containing a laser gas, said envelope having a longitudinal axis and including an anode end and a cathode end;
an anode, at said anode end;
a cathode, at said cathode end, said cathode having a discharge current receiving surface for receiving discharge current from said anode;
an elongate capillary discharge tube having a central bore disposed along said longitudinal axis, said capillary tube having a first opening in communication with said anode for receiving discharge current from said anode, and a second opening for discharging said discharge current from said bore to said cathode, said capillary tube including a transition portion adjacent to said second opening, said transition portion lying entirely within a right circular cone having an axis coincident with said longitudinal axis, and a cone angle of no more than 60°, said cone having a cross-sectional diameter at said opening of no more than 0.125 inch;
first and second mirrors, positioned at said anode and cathode ends, respectively, of said elongate tube, said mirrors spaced along said longitudinal axis to form a resonant cavity for light propagating through the bore of said capillary tube; and
said cathode having a forward cathode region, disposed between said second opening and said second mirror, and a rearward cathode region, disposed between said second opening and said first mirror, the current receiving surface of cathode in said rearward cathode region being cylindrical and having a substantially uniform diameter.

17. A gas laser, as defined by claim 16, wherein said forward cathode region includes a current receiving surface which is substantially hemispherical.

18. A gas lase, comprising:
an elongate envelope for containing a laser gas;
an anode, in communication with said gas;
a cathode, in communication with said gas, said cathode including a forward cathode region and a rearward cathode region, said cathode in said rearward region being generally cylindrical and having a substantially uniform diameter, said cathode in said forward cathode region having a generally hemispherical configuration;
means for applying a potential difference between said anode and said cathode to generate a discharge current in said gas;
a capillary tube, disposed in said envelope, having a bore for providing a path for conducting discharge current from said anode, said tube having a first opening adjacent to said anode for placing said bore in communication with said anode and a second opening for discharging current from said bore to said cathode, said tube having a reduced wall thickness through a transition portion extending from said second opening towards said first opening, said transition portion having an axial length substantially greater than the radial wall thickness of said tube at said second opening.

19. A gas laser, as defined by claim 18, wherein a portion of said envelope is formed of metal which is in thermal communication with said cathode to provide a heat sink for dissipating heat from said cathode, and another portion of said envelope comprises an insulating material, joined to said metal.

20. A method of manufacturing a gas laser, comprising:
providing a capillary tube having an opening for discharging current to a cathode;
reducing the wall thickness of said capillary tube at said opening to provide a transition portion, the length of said transition portion substantially greater than the wall thickness at said opening; and
preferentially directing the discharge current from said opening along a path angularly disposed from the longitudinal axis of said capillary tube by at least about 90° to inhibit metal deposition on said transition portion.

21. A method of extending the life of a gas laser, as defined by claim 18, wherein the step of reducing the wall thickness comprises conically tapering said capillary tube.

* * * * *